(12) United States Patent
Förster

(10) Patent No.: US 10,465,628 B2
(45) Date of Patent: Nov. 5, 2019

(54) COMPOSITE MATERIAL FOR A PISTON

(71) Applicant: KS Kolbenschmidt GmbH, Neckarsulm (DE)

(72) Inventor: Jan Förster, Neckarsulm (DE)

(73) Assignee: KS Kolbenschmidt GmbH, Neckarsulm (DE)

(*) Notice: Subject to any disclaimer, the term of this patent is extended or adjusted under 35 U.S.C. 154(b) by 0 days.

(21) Appl. No.: 15/768,881

(22) PCT Filed: Oct. 21, 2016

(86) PCT No.: PCT/EP2016/075371
§ 371 (c)(1),
(2) Date: Apr. 17, 2018

(87) PCT Pub. No.: WO2017/068121
PCT Pub. Date: Apr. 27, 2017

(65) Prior Publication Data
US 2018/0313295 A1    Nov. 1, 2018

(30) Foreign Application Priority Data
Oct. 21, 2015  (DE) .................. 10 2015 220 542

(51) Int. Cl.
| | |
|---|---|
| *F02F 3/00* | (2006.01) |
| *F02F 3/10* | (2006.01) |
| *C09D 179/08* | (2006.01) |
| *C09D 7/62* | (2018.01) |
| *C09D 5/18* | (2006.01) |
| *C09D 163/00* | (2006.01) |

(52) U.S. Cl.
CPC ............... *F02F 3/10* (2013.01); *C09D 5/18* (2013.01); *C09D 7/62* (2018.01); *C09D 163/00* (2013.01); *C09D 179/08* (2013.01); *F02F 3/0084* (2013.01)

(58) Field of Classification Search
CPC .................. F02F 3/10; F02F 3/0084
See application file for complete search history.

(56) References Cited

U.S. PATENT DOCUMENTS

| | | | | | |
|---|---|---|---|---|---|
| 5,257,603 | A * | 11/1993 | Bauer | ............. | C08L 79/08 123/193.6 |
| 5,543,475 | A * | 8/1996 | Jones | ............. | C08G 18/42 525/444 |
| 5,677,394 | A * | 10/1997 | Bohme | ............. | C08G 63/685 525/174 |
| 6,130,190 | A * | 10/2000 | Gunsel | ............. | C10M 169/04 508/110 |
| 6,425,364 | B1 * | 7/2002 | Craft | ............. | F02B 61/045 123/193.6 |
| 6,559,261 | B1 * | 5/2003 | Milne | ............. | C07C 69/50 526/279 |
| 6,676,851 | B1 * | 1/2004 | Buchecker | ............. | C07C 69/92 252/299.61 |
| 8,220,433 | B2 * | 7/2012 | Sasaki | ............. | C10M 111/04 123/193.6 |
| 8,262,933 | B2 * | 9/2012 | Sekimura | ............. | C08J 3/203 252/299.01 |
| 8,667,945 | B2 * | 3/2014 | Sasaki | ............. | F02F 3/10 123/193.1 |
| 8,669,305 | B2 * | 3/2014 | Fujimoto | ............. | C08K 3/04 523/454 |
| 8,835,549 | B2 * | 9/2014 | Gao | ............. | C09D 4/00 427/255.14 |
| 9,074,628 | B2 * | 7/2015 | Yamane | ............. | F04B 27/0886 |
| 9,096,719 | B2 * | 8/2015 | Zhang | ............. | C08G 73/00 |
| 9,181,897 | B2 * | 11/2015 | Takada | ............. | C23C 28/30 |
| 9,255,545 | B2 * | 2/2016 | Rehl | ............. | C10M 111/04 |
| 9,316,298 | B2 * | 4/2016 | Yamane | ............. | F04B 27/086 |
| 9,365,792 | B2 * | 6/2016 | Sasaki | ............. | F02F 3/10 |
| 9,822,728 | B2 * | 11/2017 | Hiratsuka | ............. | F02B 77/11 |
| 9,828,934 | B2 * | 11/2017 | Hamada | ............. | C23C 4/067 |
| 9,903,310 | B2 * | 2/2018 | Bieneman | ............. | F02F 3/14 |
| 10,174,711 | B2 * | 1/2019 | Takada | ............. | F02F 3/105 92/223 |
| 2006/0117947 | A1 * | 6/2006 | Tabata | ............. | F02F 3/105 92/223 |
| 2008/0163751 | A1 | 7/2008 | Subramanian et al. | | |
| 2009/0156437 | A1 * | 6/2009 | Kuroda | ............. | C09D 163/00 508/107 |
| 2013/0269666 | A1 | 10/2013 | McAlister | | |
| 2017/0204245 | A1 * | 7/2017 | Laing | ............. | C08K 3/04 |

FOREIGN PATENT DOCUMENTS

| | | |
|---|---|---|
| DE | 10 2005 057754 A1 | 6/2006 |
| DE | 10 2013 206801 A1 | 10/2014 |
| DE | 10 2014 212927 A1 | 1/2015 |
| EP | 1 933 022 A2 | 6/2008 |
| WO | 2012/041769 A2 | 4/2012 |
| WO | 2014/139816 A1 | 9/2014 |

\* cited by examiner

Primary Examiner — Thomas N Moulis
(74) Attorney, Agent, or Firm — Young Basile Hanlon & MacFarlane, P.C.

(57) ABSTRACT

A composite material selectively applied to at least surface areas of a piston of an internal combustion engine. The composite material contains at least high temperature polymers and/or liquid crystalline polymers (LCP).

14 Claims, No Drawings

COMPOSITE MATERIAL FOR A PISTON

TECHNICAL FIELD

The invention relates to a composite material for a piston of an internal combustion engine.

BACKGROUND

Composite skirt coating for reduced friction and increased resistance to seizing.

Composite material for coating of fast moving internal combustion engine components, in particular piston skirts, to reduce friction losses and increase resistance to seizing and also increase wear resistance.

To safeguard running-in and emergency operation properties the prior art uses piston coatings made of polymer composites based on polyamide-imide or epoxy carrier resins or solid lubricant mixtures comprising a very wide variety of fillers (usually graphite or MoS2 and/or carbon fibers and recently also PTFE and nanodiamonds). These polymer-based layers are usually applied in dissolved/dispersed form as monolayers or else as multilayers and subsequently cured/polymerized at elevated temperature. The solvents employed evaporate and the employed mass is reduced.

Also known from the prior art is an iron coating of the piston skirt or of the entire piston.

The application and effects of such coatings are well known and are not described in any detail herein below.

SUMMARY

The present invention has for its object to improve the well-known types of piston skirt coatings in terms of their properties (friction, wear, running in behavior and adhesion of the coating to the piston).

The object is achieved in accordance with the invention by proposing a piston of an internal combustion engine comprising a composite material applied at least regionally to the surface of the piston, wherein the composite material contains at least high temperature polymers and/or liquid crystal polymers (LCP).

The invention further provides that the high-temperature polymers consist of polyamide-imide (PAI) and/or epoxy carrier resins.

The invention further provides that for production of the composite material the liquid crystal polymers (LCP) may be dissolved in ionic liquids (IL).

The invention further provides that the composite material contains graphene (single layer of graphite layer structures), in particular functionalized graphene.

In other words, the object is achieved as follows: the novel "hybrid polymer", i.e. the composite material, shall consist on a matrix of high temperature polymers such as polyamide-imide (PAI) or epoxy resins which are provided with liquid crystal polymers. These LCPs may be dissolved in ionic liquids (IL) which would then likewise integrate into the matrix. A further material shall consist of graphene, in particular of functionalized graphene. These novel additions (LCP, IL and graphene) promise significant improvements in the properties of the base polymers.

The new composite materials achieve an improvement in running-in behavior, increased resistance to seizing, a reduction in friction and increased wear resistance (higher lifetime of components for internal combustion engines, in particular pistons). This results in a reduction in fuel consumption and in carbon dioxide emissions (CO2-impressions) for operation of the internal combustion engine.

Progress over the prior art includes reducing or even avoiding quality problems such as layer flaking or layer wear in components for internal combustion engines, in particular pistons, through the use of the composite materials/coatings according to the invention. Iron coatings may be completely replaced by the coatings/composite materials according to the invention for components for internal combustion engines, in particular pistons, while achieving improved or at least comparable wear properties. The coatings/composite materials according to the invention allow manufacturing processes to be simplified.

DETAILED DESCRIPTION

High temperature polymers are suitable for use temperatures of above 200 degrees Celsius. Polyamide-imides (PAI) having aromatic building blocks in the polymer chain belong to this class and form thermoplastics. They also provide high chemicals resistance and wear resistance. Polyamide-imides are therefore particularly suitable as a heat-resistant constituent of a composite material for pistons for internal combustion engines. The sustained use temperature is above 220° C.

Compared to customary thermoplastics liquid crystal polymers (LCP) even in the melted state and/or dissolved state have ordered, usually crystalline, regions exhibiting higher-order structures. These are somewhere between the structure of the three-dimensionally fully ordered crystal and the structure of the conventional structurally unordered liquid. As a result of these highly oriented structures LCP are self-reinforcing in the solid state. This is dependent on the presence of certain structural elements, so-called mesogenic groups. These may be located either in the main chain or in side chains. In addition to differentiation as main or side chain LCP these may also be classified according to their existence conditions. Accordingly, a distinction is then made between thermotropic LCPs (liquid crystal phase in the melt) and lyotropic LCPs (liquid crystal phase in solution). The arrangement of the mesogens in the polymer chains results in extraordinary chemical and mechanical properties. By way of example, main chain LCPs exhibit an extremely high tensile strength and a high modulus of elasticity parallel to the molecular axis. Accordingly, main chain liquid crystal polymers are particularly suitable for employment as a high-performance fiber for use in a composite material for pistons for use in internal combustion engines. The anisotropy of many properties thus allows specific adjustment of the properties of the material composite.

The term "epoxides" describes a group of reactive organic compounds containing a ring consisting of three atoms, of which two are a C atom and one is an O atom, as a structural element. The compound class of the epoxides reacts with a multiplicity of organic compounds to undergo ring opening. By way of example, under suitable conditions epoxides polymerize with polyhydric phenols to afford epoxy resins. Epoxy resins (EP resins) are polyethers. They belong to the reactive resins which may be reacted with a hardener and optionally further additives to afford a thermosetting plastic. The hardener component constitutes the reaction partner and is accordingly a fixed constituent of the plastic formed. The thus generated thermosets have good mechanical properties and good heat and chemicals resistance. On account of these properties they are particularly suitable for use in a composite material for pistons.

Ionic liquids (IL) are substances which are made up entirely of ions and in contrast to high viscosity and corrosive melts of conventional salts (e.g. alkali metal salt melts) are often in the liquid phase with moderate viscosities even at room temperature (RTILs, Room Temperature Ionic Liquids) or else by definition have a melting point of <100° C. Of importance for the low melting point of the ionic liquids at the molecular level are mainly three structural properties of a cation: namely low symmetry, good charge distribution and low intermolecular interactions. These properties prevent the formation of a stable crystal lattice. The properties of ionic liquids such as for example solubility, melting point and thermal stability may be specifically adjusted and adapted to the requirements by modification of the ion pairs. They are accordingly particularly suitable for production or as part of a composite material for pistons for internal combustion engines.

The term "graphene" describes a precisely monatomic layer of pure carbon. This material is one of a plurality of (crystallographic) modifications of carbon. Despite their identical chemical composition these have different properties which is a result of the different arrangement of the atoms. A two-dimensional structure in which each carbon atom is surrounded at an angle of 120° by three further carbon atoms forms a type of honeycomb-like motif. Graphene is one of the most stable known materials and inter alia has a high tear strength. As a result of these properties graphene is particularly suitable for the production of a composite material for pistons for internal combustion engines.

The composite material according to the invention may be applied at least regionally to the surface of components for internal combustion engines, in particular pistons, as a coating.

What is claimed is:

1. A piston of an internal combustion engine comprising: a composite material applied at least regionally to a surface of the piston, characterized in that the composite material is a hybrid polymer comprising a matrix of high temperature polymers and liquid crystal polymers (LCPs) including at least one mesogenic group.

2. The piston as claimed in claim 1, characterized in that the high-temperature polymers consist of at least one of polyamide-imides (PAI) or epoxy resins.

3. The piston of claim 1 characterized in that the liquid crystal polymers (LCP) for producing the composite material are dissolved in ionic liquids (IL).

4. The piston of claim 1 characterized in that the composite material contains functionalized graphene.

5. The piston of claim 2 wherein the composite material comprises high-temperature polymers and liquid crystal polymers (LCP), wherein the LCP for producing the composite material are dissolved in ionic liquids (IL).

6. The piston of claim 5 wherein the composite material further comprises functionalized graphene.

7. The piston of claim 2 wherein the composite material contains functionalized graphene.

8. The piston of claim 3 wherein the composite material contains functionalized graphene.

9. The piston of claim 1 wherein the LCP in a melted state has a crystal structure between a three-dimensionally fully ordered crystal and an unordered liquid.

10. The piston of claim 1 wherein the LCP in a solid state has a self-reinforcing crystal structure.

11. The piston of claim 1 wherein the LCP is a thermotropic LCP.

12. The piston of claim 1 wherein the LCP is a lyotropic LCP.

13. The piston of claim 1 wherein the at least one mesogenic group is located in a main chain of the hybrid polymer.

14. The piston of claim 1 wherein the at least one mesogenic group is located in a side chain of the hybrid polymer.

* * * * *